United States Patent [19]

Schumann

[11] 4,300,067

[45] Nov. 10, 1981

[54] PERMANENT MAGNET MOTION CONVERSION DEVICE

[76] Inventor: Albert A. Schumann, 2616 N. 56th St., Milwaukee, Wis. 53210

[21] Appl. No.: 130,668

[22] Filed: Mar. 17, 1980

[51] Int. Cl.³ .............................................. H02K 7/06
[52] U.S. Cl. ........................................ 310/80; 310/24; 310/103
[58] Field of Search .................. 310/23, 24, 80, 103, 310/46

[56] References Cited

U.S. PATENT DOCUMENTS

| | | | |
|---|---|---|---|
| 3,703,653 | 11/1972 | Tracy et al. | 310/24 |
| 3,811,058 | 5/1974 | Kiniski | 310/24 X |
| 3,879,622 | 4/1975 | Ecklin | 310/24 X |
| 3,899,703 | 8/1975 | Kinnison | 310/103 |
| 3,935,487 | 1/1976 | Czerniak | 310/103 X |
| 3,967,146 | 6/1976 | Howard | 310/24 |

Primary Examiner—Donovan F. Duggan

[57] ABSTRACT

A permanent magnet motion conversion device includes spaced stationary permanent magnets and a carriage having permanent magnets located adjacent the ends of the carriage. The carriage shuttles back and forth between the permanent magnets as a result of magnetic repulsion when shield plates are moved into and out of shielding positions in front of the stationary magnets. The carriage is provided with a connecting rod which is connected to a crank shaft. More than one carriage can be employed.

3 Claims, 3 Drawing Figures

U.S. Patent  Nov. 10, 1981  Sheet 1 of 2  4,300,067

PERMANENT MAGNET MOTION CONVERSION DEVICE

BACKGROUND OF THE INVENTION

The invention relates to permanent magnet motors. Various permanent magnet motor designs have been developed. The following patents illustrate various permanent magnet motor designs: U.S. Pat. Nos. 3,879,662; 3,703,653; 3,967,146; and 3,636,391. Various of these patents, such as U.S. Pat. No. 3,703,653 show the use of shield plates which are interposed between the stationary permanent magnets at the proper time to interrupt the flux path and prevent repulsion of the like poles of the stationary and movable magnets as the movable magnet approaches the stationary magnet. When the movable magnet has reached top dead center adjacent the stationary magnet and is in position for the power stroke, the shielding plates are then withdrawn to allow the magnet repulsion to cause movement of the movable magnets and the output shaft connected thereto.

SUMMARY OF THE INVENTION

The invention provides a permanent magnet motor with improved efficiency which reduces the distance through which the flux shields must move to uncover the magnet and thus reduce the energy required for this function. In addition, the motor is double acting. In this regard, a carriage is provided containing permanent magnets which move between spaced stationary permanent magnet assemblies. A centrally located stationary permanent magnet assembly between the magnets on the carriage increase the number of magnets involved in causing carriage movement to increase the torque of the output shaft. The stationary permanent magnet assemblies include upper and lower bar-shaped permanent magnets which are separated by a gap, and the shields which move between advanced and retracted positions include a window to expose the upper permanent magnets in the stationary permanent magnet assemblies in the repulse cycle. The use of windows minimizes the distance or mechanical motion required to uncover the shields from the permanent magnets and thus reduces the overall effort and energy required to move the shields.

The shielding plates are controlled by a linkage driven by fast acting cam tracks which quickly withdraw the plates when the movable magnets are very close to the stationary magnets to obtain maximum repulsive affect and hence torque of the output shaft.

Further objects, advantages and features of the invention will become apparent from the disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
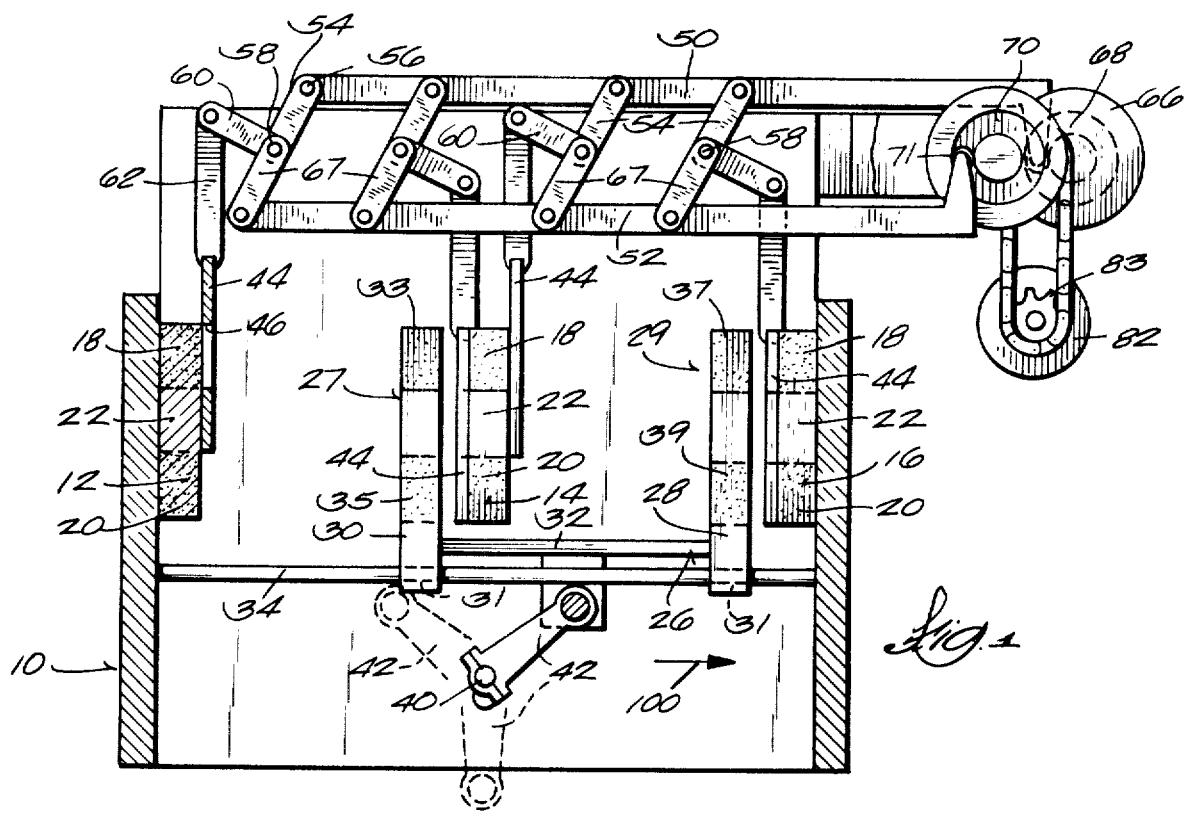
FIG. 1 is a diagrammatic side elevational view of the motor in accordance with the invention.
Figure 2:
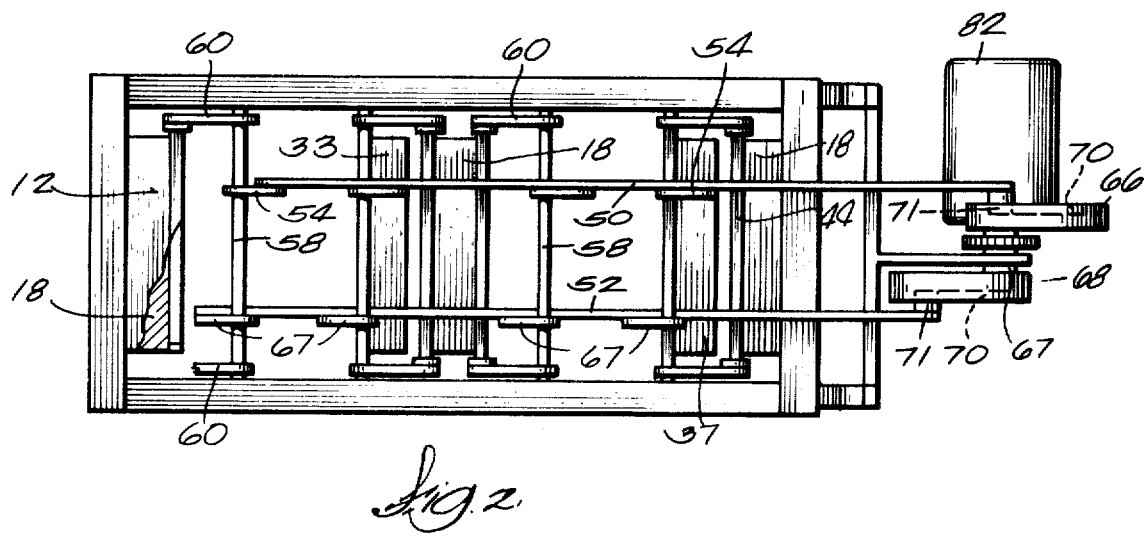
FIG. 2 is a plan view of the motor shown in FIG. 1.

FIG. 1 shows a frame 10 which supports stationary permanent magnet assemblies 12, 14 and 16 which are supported on the frame. Each of the permanent magnet assemblies include two permanent bar magnets 18 and 20 which are spaced by a gap 22 (FIG. 1). The bar magnets in each assembly are arranged with their like poles at the same sides of the assemblies.

Figure 3:
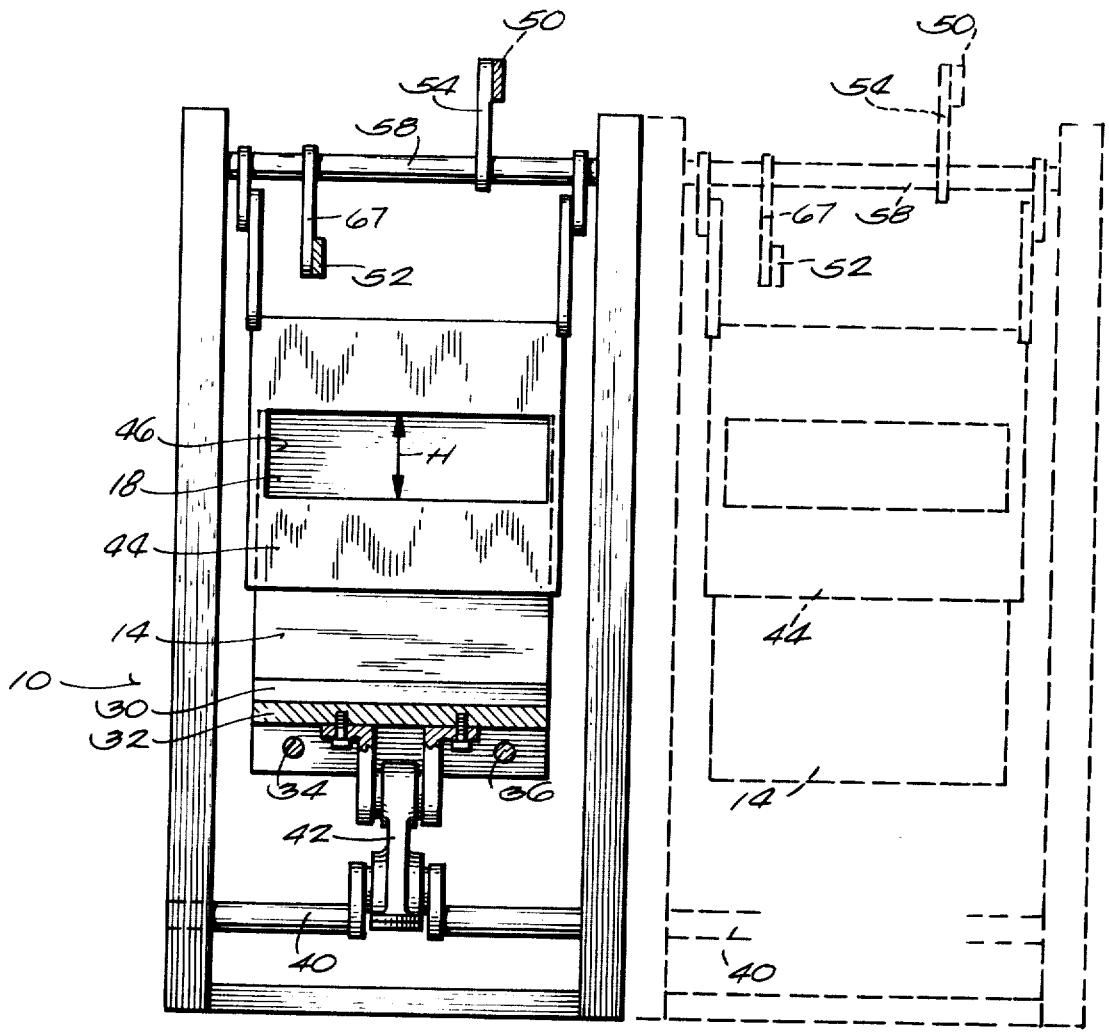
FIG. 3 is an enlarged end view showing one magnet carriage in full lines and a second magnet carriage in broken lines.

The movable permanent magnet assemblies 27 and 29, with upper and lower magnets 33, 35, 37 and 39, are supported on a carriage 26 which includes spaced magnet supports 28 and 30 connected by cross members 32. A pair of spaced guide rods 34 and 36 (FIGS. 1 and 3) are received in apertures 31 in the carriage and guide reciprocating movement of the carriage 26 during movement between the stationary permanent magnet assemblies 12, 14 and 16. The carriage is connected to the crank 41 of an output shaft 40 by a connecting rod 42. Shuttling movement of the carriage, as hereinafter described, causes rotary motion of the crank shaft or output shaft for the useful power output.

In accordance with the invention, shielding plates or shields made of a metal that can short circuit a magnetic flux path, as as steel, are provided to enable movement of the carriage in close proximity to the stationary magnets without repulsion of the like poles of the movable carriage magnets and the stationary permanent magnets. In the disclosed contruction, the shields 44 (FIG. 3) include windows 46 located generally centrally of the shields 44 and which have a vertical dimension or height H (FIG. 3) approximately equal to or greater in height than the permanent magnet bars so as to expose the upper magnet bars 18 in the permanent magnet assemblies, as shown in FIG. 1. The lower magnet bars 13 are exposed when the shields 44 reach the uppermost position and clear the lower magnets.

Means are provided for raising and lowering the shields in timed sequence with the position of the carriage relative to the stationary magnets to remove the shields from the magnets at the appropriate time. The movable magnets are desirably within 0.030 inches of the shields, or as close as mechanically practicable, when the shields are moved to obtain maximum repulsion. In the disclosed construction, there are two overhead shifter rods 50 and 52. Shifter rod 50 is connected to the shields by a linkage assembly which includes crank arms 54 which are pivotally connected by pivots 56 to the shifter rod 50. The crank arms 54 are fixedly connected to stationary cross rods 58. Cross rods 58 are fixed to crank arms 60 which are pivotally connected to links 62. The links 62 are connected to the plates or shields 44.

The shifting of the shifter rod 50 is controlled by a cam disc 66. The disc 66 is eccentrically mounted on a shaft 67. Similarly, a disc 68 is provided which is connected to rod 52. The discs 66 and 68 include cam tracks 70 which receive and coact with cam followers 71 rotatably connected to the shifter rods 50, 52. The cam tracks are shaped and timed with respect to the carriages to provide quick or rapid withdrawal of the shields 44 in the appropriate sequence as the carriage magnets closely approach the plates. The discs 66, 68 are rotated by an electric motor 82 connected to the shaft 67 by a gear drive or a chain and sprocket drive 83, as illustrated.

There are desirably provided at least three carriages with the cranks oriented at 120° with respect to each other, as illustrated in FIG. 1.

In operation, the carriage 26 (FIG. 1) is shown moving in the direction of arrow 100 as the carriage magnet assembly 27 approaches stationary magnet assembly 14 and as carriage magnet assembly 29 approaches stationary magnet assembly 16. The shield plates 44 between these magnet assemblies are withdrawn by action of the linkage assemblies under influence of the cam tracks. As the stationary magnets are exposed, the like poles of the stationary magnet and movable magnet assembly cause magnetic repulsion to urge the carriage 26 to the left. The shield plates 44 would then move into position over the stationary magnet assemblies 12 and 14. The use of the centrally located stationary magnet assembly substantially increases the output of the motor.

I claim:

1. In a permanent magnet motor conversion device including spaced stationary permanent magnets, the improvement comprising a carriage, means for supporting the carriage for reciprocating rectilinear movement between said stationary permanent magnets, spaced permanent magnets supported on said carriage, an output shaft, means connecting said carriage to said output shaft, magnetic shields, means for supporting said shields for reciprocating movement in planes generally parallel to the faces of said stationary permanent magnets, and means for moving said plates in a sequence in which said plates are withdrawn from covering the faces of said permanent magnets as the permanent magnets on the carriage move into proximity of said stationary permanent magnets to cause a repulsion of the magnets on said carriage to move the carriage to an opposite position whereby said carriage is shuttled back and forth causing rotation of said output shaft.

2. The improvement of claim 1 wherein said permanent magnet stationary assemblies include upper and lower bar-shaped magnets being spaced by a gap and said magnetic shields have windows to expose one of said magnets through the window when the plate is in the retracted repulse state and to cover both magnets when said carriage permanent magnets are approaching the stationary magnets.

3. The improvement of claim 1 including a stationary permanent magnet assembly located between said carriage permanent magnets for coaction with said carriage magnets.